United States Patent
Summers et al.

[11] Patent Number: 6,160,940
[45] Date of Patent: Dec. 12, 2000

[54] FIBER OPTIC CABLE FOR INSTALLATION IN A CABLE PASSAGEWAY AND METHODS AND AN APPARATUS FOR PRODUCING THE SAME

[75] Inventors: Timothy F. Summers; Kevin T. White, both of Hickory; Donald K. Hall, Mooresville; George C. Abernathy, Hildebran; Bruce E. Townsend, Hickory, all of N.C.; Thomas Müeller, Bettelhecker Stasse, Germany

[73] Assignee: Corning Cable Systems LLC, Hickory, N.C.

[21] Appl. No.: 09/161,033

[22] Filed: Sep. 25, 1998

Related U.S. Application Data

[63] Continuation-in-part of application No. 08/869,819, Jun. 5, 1997, Pat. No. 5,920,672.

[51] Int. Cl.[7] .................................................. G02B 6/44
[52] U.S. Cl. ......................... 385/110; 385/113; 385/147
[58] Field of Search ............................. 385/147, 100–114

[56] References Cited

U.S. PATENT DOCUMENTS

| | | | |
|---|---|---|---|
| 4,312,566 | 1/1982 | Jackson | 350/96.23 |
| 4,435,238 | 3/1984 | Smith | 156/171 |
| 4,456,331 | 6/1984 | Whitehead et al. | 350/96.23 |
| 4,534,618 | 8/1985 | Brüggendieck | 350/96.23 |
| 4,548,567 | 10/1985 | Missout | 425/113 |
| 4,623,495 | 11/1986 | Degoix et al. | 264/1.5 |
| 5,087,110 | 2/1992 | Inagaki et al. | 385/110 |
| 5,673,352 | 9/1997 | Beauer et al. | 385/114 |
| 5,717,805 | 2/1998 | Stulpin | 385/114 |
| 5,737,470 | 4/1998 | Nagano et al. | 385/114 |
| 5,740,295 | 4/1998 | Kinard et al. | 385/109 |
| 5,802,231 | 9/1998 | Nagano et al. | 385/114 |

FOREIGN PATENT DOCUMENTS

| | | | |
|---|---|---|---|
| 0 467 757 A1 | 1/1992 | European Pat. Off. | H01B 7/04 |
| 09152531 | 6/1997 | Japan | G02B 6/44 |
| 09197221 | 7/1997 | Japan | G02B 6/44 |
| 10021763 | 1/1998 | Japan | H01B 11/22 |

OTHER PUBLICATIONS

Study on foamed polyethylene slotted rod, IEICE, 1998.
Design of optical fiber cable suitable for effiecient cable installation, IEICE, 1998.

*Primary Examiner*—Hung N. Ngo
*Attorney, Agent, or Firm*—Timothy J. Aberle

[57] ABSTRACT

A fiber optic cable (40,50) having a cellularized cable component (10,10',10"), the cellularized cable component including at least one optical fiber and a cable jacket (45,55). The cable jacket can include surface irregularities (46,56) having crests and hollows (46a,46b;56a,56b) for reducing surface-to-surface contact with a surface (60) in the cable passage way. The cable jacket can include a friction reducing additive for lubricating the interface between the cable jacket and the cable passageway or objects in the cable passageway. A method and apparatus for producing the cables is also disclosed.

34 Claims, 3 Drawing Sheets

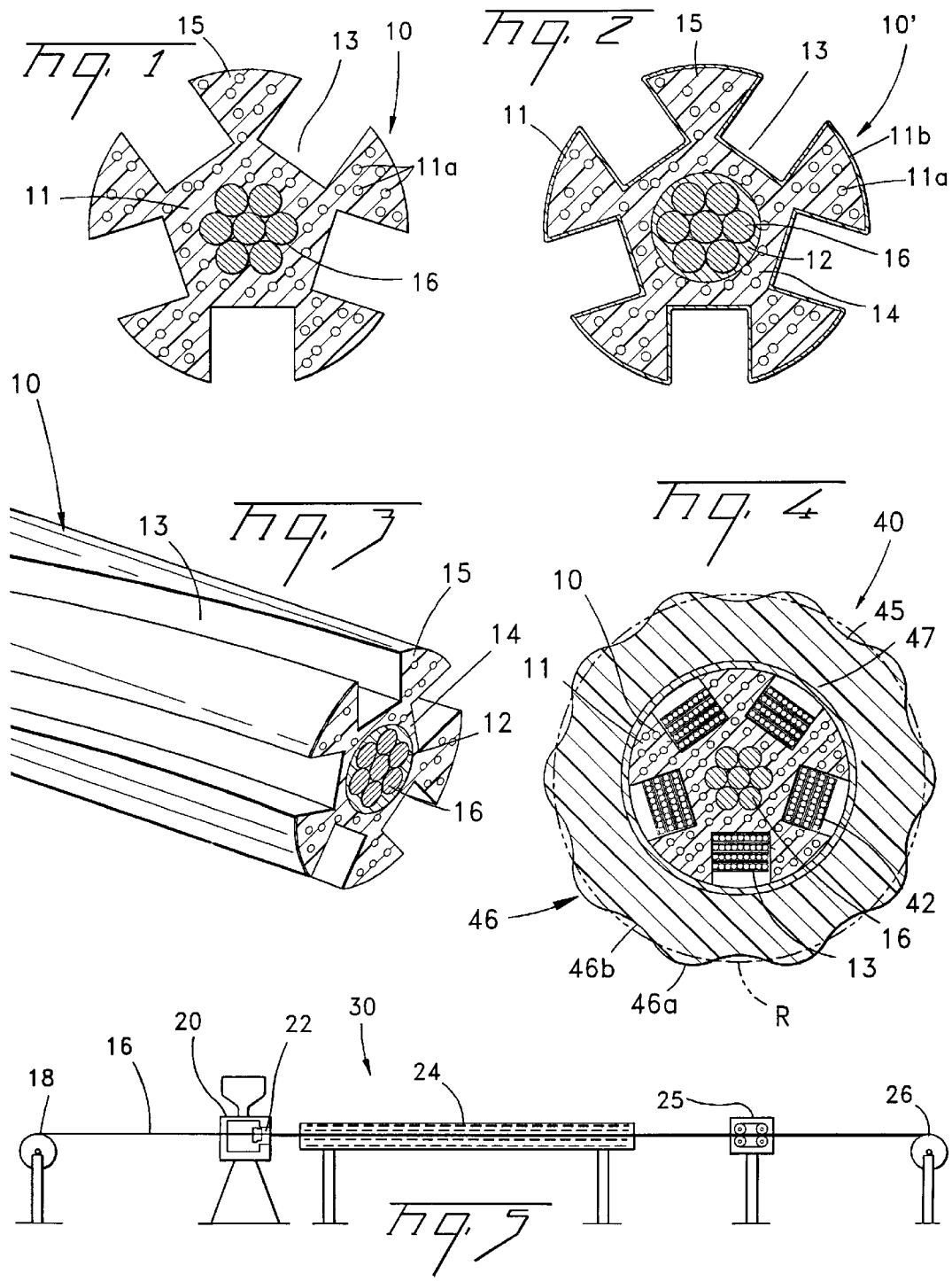

FIBER OPTIC CABLE FOR INSTALLATION IN A CABLE PASSAGEWAY AND METHODS AND AN APPARATUS FOR PRODUCING THE SAME

RELATED APPLICATIONS

The present invention is a Continuation-in-Part of U.S. Ser. No. 08/869,819, filed Jun. 5, 1997, U.S. Pat. No. 5,920,672 which is incorporated by reference herein.

FIELD OF THE INVENTION

The present invention relates to a fiber optic cable that is suitable for installation in a cable passageway.

BACKGROUND OF THE INVENTION

Conventional fiber optic cables include optical fibers which are capable of transmitting voice, video, and data information. A fiber optic cable should have a craft-friendly construction which permits ease of installation. Installation of a fiber optic cable typically requires the pulling of the cable through a cable passageway. The cable passageway can be, for example, a duct, a tube, a cable enclosure, building structural features, a trough, a tunnel, a tray, a trunk, a manhole, a handhole, a fingerhole, or a splice box.

The ease with which a fiber optic cable is installed in a cable passageway may be dependent on certain characteristics of the fiber optic cable. For example, surface area contact between the cable jacket, which is typically of the circular profile type, and surface areas in the cable passageway causes frictional resistance to the cable pulling force. Resistance to the cable pulling force can be a limiting factor regarding the length or ease of the cable to be pulled. Such resistance may also be a function of the coefficient of friction of the cable jacketing material. Additionally, a light-weight cable is generally easier to pull than a heavy cable. Cable flexibility is a factor as the use of stiff cable components makes the cable difficult to bend during the cable pulling operation. Cable size is also a factor as a cable with a small cross sectional area is generally easier to pull through a narrow passageway than a cable with a large cross sectional area. Moreover, apart from ease of installation, the cost per unit length of the cable may be an important factor in deciding between commercially available fiber optic cables.

Taking the foregoing factors into consideration, fiber optic cable designs having circular profile jackets are part of the background of the present invention. For example, a fiber optic cable which may be difficult to route through a passageway is disclosed in U.S. Pat. No. 5,029,974. The cable includes two steel strength members embedded in a circular profile cable jacket. The steel strength members are designed to resist axial compression due to, for example, aging shrinkage or thermal contraction of the cable jacket. The use of steel strength members creates a spark hazard and their weight may negatively affect the cable pulling operation. Additionally, the circular profile jacket can present a substantial degree of surface area contact and friction with the cable passageway that can result in substantial resistance to a cable pulling force.

Additionally, fiber optic cable designs having noncircular profile jackets may be difficult to install in cable passageways. For example, the cable disclosed in U.S. Pat. No. 4,844,575 is of the composite cable type and includes an oval profile cable jacket. The oval profile can present a substantial amount of surface area contact with the cable passageway, and the weight of the cable can make it difficult to install in a cable passageway.

OBJECTS OF THE INVENTION

It is an object of the present invention to provide a fiber optic cable that is easy to install in a cable passageway.

It is another object of the present invention to provide a fiber optic cable that is of a light weight and presents minimal resistance to a cable pulling force during installation.

BRIEF DESCRIPTION OF THE DRAWINGS

FIG. 1 is a cross-sectional view of a fiber optic cable component according to the present invention.

FIG. 2 is a cross-sectional view of a fiber optic cable component according to the present invention.

FIG. 3 is an isometric view of the fiber optic cable component of FIG. 2.

FIG. 4 is a cross-sectional view of a fiber optic cable according to the present invention.

FIG. 5 is a schematic view of an apparatus for forming a fiber optic cable component according to the present invention.

DETAILED DESCRIPTION OF THE INVENTION

Figure 6:
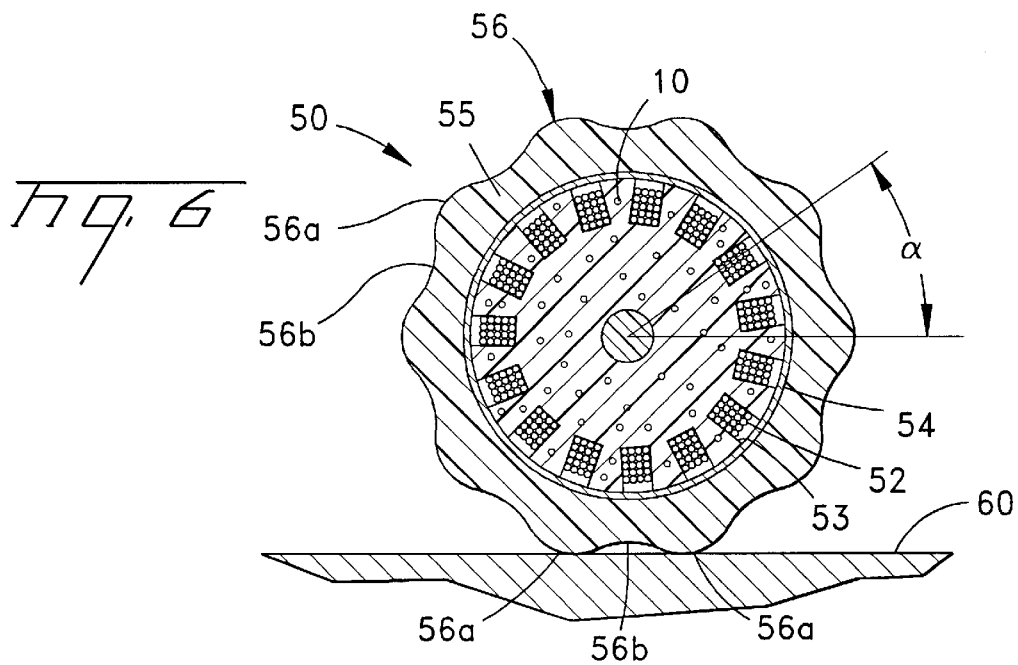
FIG. 6 is a cross sectional view of a fiber optic cable according to the present invention.

Referring to FIGS. 1–4, an exemplary easy to install fiber optic cable 40 according to the present invention will be described. Fiber optic cable 40 includes a fiber optic cable component 10, for example, a slotted core. Component 10 can include optical fiber ribbons 42 or individual optical fibers (not shown) disposed in features of a rod 11, for example, recesses 13. Rod 11 can be surrounded by a wrapping tape 47 (FIG. 4) and binders (not shown), a water swellable tape or barrier, and/or an armor layer. To minimize cable pulling force, fiber optic cable 40 can include a low pulling resistance cable jacket 45 having a profile including surface irregularities. The surface irregularities of cable jacket 45 can be in the form of, for example, an undulated profile 46. In addition, cable jacket 45 can include a friction reducing additive, described in more detail hereinbelow. Profile 46 can include crests 46a and hollows 46b that have generally arcuate surfaces, but profile 46 may include some flat sections. In general, however, crests and hollows 46a, 46b can define a sinusoidal-like cross-sectional circumference, e.g., as compared to a circular profile R (FIG. 4), which circumference can be substantially aligned with the center of fiber optic cable 40.

Figure 8:
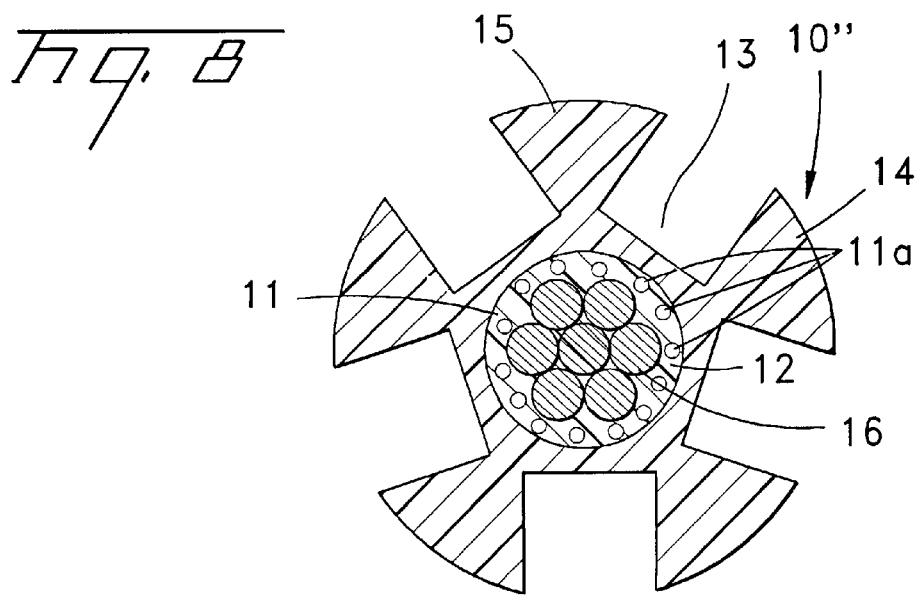
FIG. 8 is a cross-sectional view of a fiber optic cable component according to the present invention.

As noted above, fiber optic cables of the present invention can include a fiber optic cable component 10. Alternatively, a fiber optic cable of the present invention can include an exemplary component 10' (FIG. 2) or 10" (FIG. 8). Fiber optic cable components 10,10',10" are of a light weight construction, thereby making cables of the present invention easier to install in a cable passageway. Respective rods 11 of components 10,10',10" may include a central member, for example, a steel strength member 16 with one or more stranded wires. Alternatively, strength member 16 can be a glass or aramid yarn reinforced plastic member, or a combination of glass and aramid yarn. Rod 11 can be cellularized with gas-filled cells, for example, discrete cells 11a in a single layer of plastic. The cellularized structure of rod 11 reduces the overall density thereof and reduce the weight of the fiber optic cable in which it is installed. Alternatively, fiber optic cables made according to the present invention can include a multi-layer fiber optic cable component 10' including a non-cellularized inner layer 12 and a cellularized outer layer 14 (FIG. 2). Either or both of the layers 12,14 may be cellularized. For example, as shown in FIG. 8, fiber optic cable component 10" includes an inner layer 12 that is cellularized, and an outer layer 14 that has little or no cellularization. Inner layer 12 may be, for example, cellularized to about a 5% to 50% density reduction or higher. Layers 12,14 may be the same or different materials, and the layers can be co-extruded or extruded sequentially. Additionally, a rod 11 according to the present invention may include a plastic skin 11b (FIG. 2) formed of, for example, a material having a suitable modulus, e.g. high or medium density polyethylene. The plastic skin can be co-extruded or extruded subsequently with the rod material. Skin 11b improves the strength, smoothness, and water impermeability of rod 11.

The cellularized structure of rod 11 according to the present invention may be formed by the mixing of a polymeric material with a cellularizing agent. The cellularizing agent may, for example, include: a conventional pre-mixed chemical foaming agent; a gas dissolved in the melt under high pressure which becomes expands upon a pressure drop after the extrusion process; or a volatile liquid dissolved in the melt which will change into a gas at the high temperature of the melt after the extrusion process when the pressure returns to atmospheric. An example of a suitable chemical foaming agent is a Celogen AZNP130 agent made by Uniroyal. An example of a suitable pre-mixed chemical foaming agent is a DHDA8885 material made by Union Carbide. Alternatively, the cellularizing agent may comprise solid or hollow particles formed of glass microspheres, carbon, metal, ceramics, polymers, or resins singly or in mixtures to achieve one or more of the advantages of the invention. Selected gas or chemical cellularizing agents should have a low diffusion rate in the material. Preferred conventional polymeric materials for rod 11 include polyolefins, for example, polypropylene, polyethylene, or blends thereof. In addition, rod 11 may be cellularized by injecting a cellularizing agent comprising a compressed gas or a volatile liquid material into the extruder during the extrusion process. Suitable materials for injection into the extruder comprise butane, pentane, nitrogen, and hexane.

The invention may also be practiced in the form of a fiber optic cable 50 (FIG. 6) including a component 10 having, for example, four-fiber ribbons 52 disposed in fifteen slots 53 of a cellularized rod 51. Cellularized rod 51 can be surrounded by a wrapping tape 54 and binders (not shown). Cable 50 can include a cable jacket 55 having an undulated profile 56. The surface irregularities of cable 50 can be configured so that at least two crests 56a will support the cable on, e.g., a curved surface 60, or virtually any surface of or in a cable passageway, so that at least one hollow 56b is between the crests, thereby minimizing the surface area contact between cable jacket 55 and surface 60.

Cable jackets 45,55 can be formed of a suitable plastic material, for example polyethylene, and, to reduce resistance to a cable pulling force, can include a friction reducing additive therein. The friction reducing additive can function by migrating to the surface of cable jackets 45,55 and lubricating the interface between the cable jackets and virtually any surface of or in the cable passageway. The friction reducing additive can be of the type of material that is essentially non-compatible with the cable jacket material. Examples of suitable friction reducing additives include fatty acids compounds or derivatives, e.g., glycerol monostearate, stearic acid, or a fatty amide wax (e.g. as sold by Witco under the tradename Kenamide). Additional examples of suitable friction reducing additives include silicone oils, fluoro-compounds (e.g. Viton), and mineral oils. In addition, the additive may be an inorganic filler, e.g., glass microspheres or talc. The friction reducing additive may be singly compounded with the cable jacket material, or mixtures of additives may be used as well.

Referring now to FIG. 5, an exemplary manufacturing line 30 for making exemplary fiber optic cable component 10 according to the present invention will be described. Manufacturing line 30 includes: a pay-off reel 18; a cross-head 20; a rotary die 22; a cooling trough 24; a capstan 25; and a take-up reel 26. Rotary die 22 includes a die profile that corresponds to the desired shape of component 10 including, for example, recesses 13. The extrusion temperature of cross-head 20 can be set at about 140° C. or below to about 200° C. or above.

In operation of manufacturing line 30, strength member 16 is fed from a reel 18 into cross-head 20. Cross-head 20 encloses a melt mixture comprising a plastic material and a cellularizing agent, the agent can be added to the material in the extruder barrel or can be pre-mixed with the material prior to entry into the extruder. As strength member 16 passes through cross-head 20, the melt mixture is extruded thereon. During this process, rotating or stationary die 22 shapes the melt into a rod 11. Rod 11 can be rotated while the die is stationary to form recesses of a helical or an alternating pitch. Typically, a foaming agent is incorporated into the polymer to produce a foamed plastic material which is up to about, for example, 50% or more gas-filled cells. Closed cells are the preferred cell configuration of the present invention. Next, cooling trough 24 cools rod 11 into a solid fiber optic cable component 10. Fiber optic cable component 10 is pulled by capstan 25 and is then received by a take-up reel 26. As noted above, to produce a two-layer spacer rod as shown in FIG. 2, first layer 12 and second layer 14 can be co-extruded about strength member 16, or extruded sequentially in separate extrusion operations (not shown).

Figure 7:
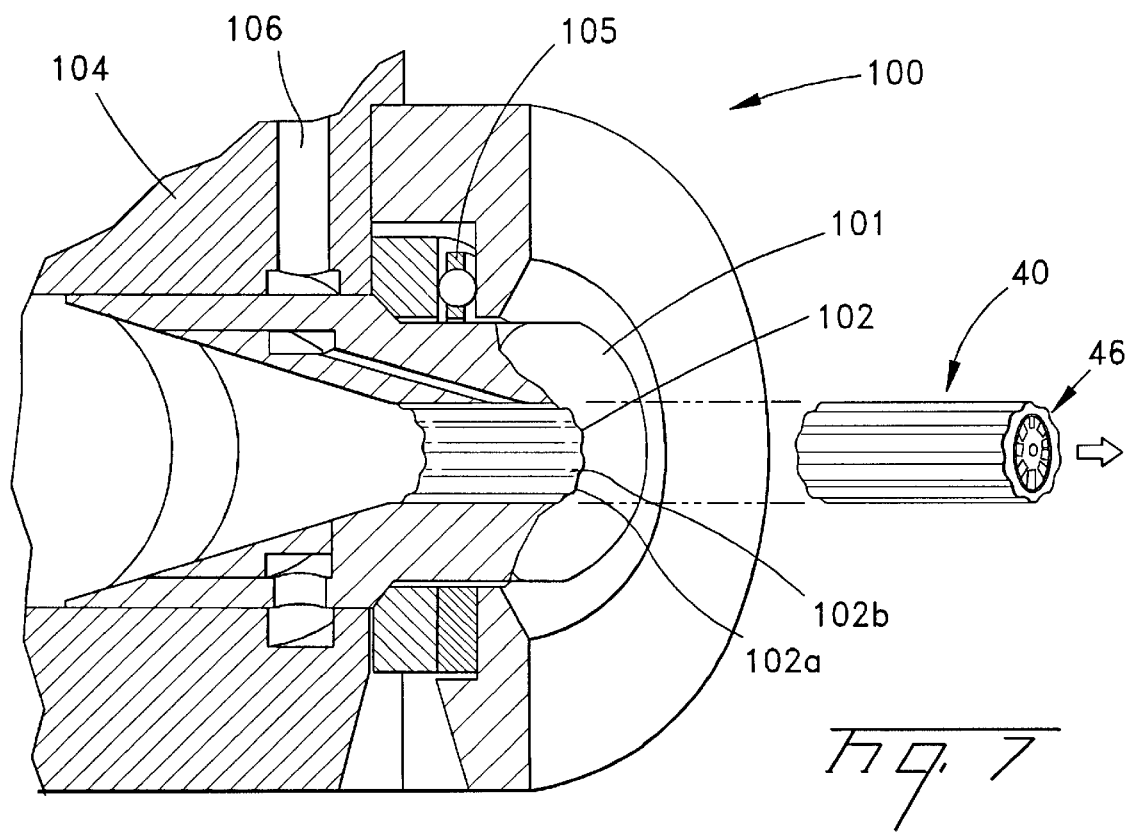
FIG. 7 is an isometric view of an extrusion unit for extruding a cable jacket of fiber optic cables of the present invention.

Components 10,10',10" can be fed into a fiber optic cable manufacturing line where optical fiber ribbons 44,52 or individual optical fibers can be stranded into respective recesses 13,53. Profiles 46,56 may be formed with an exemplary extrusion unit 100 (FIG. 7). Extrusion unit 100 includes a die 101 with a profile 102 cut therein including channels 102a and ridges 102b that extend longitudinally into the die and form the crests and hollows 46a,46b;56a,56b of profiles 46,56. Die 101 can be stationary relative to a frame 104, or mounted through a bearing 105 which permits relative rotational movement between die 101 and frame 104. Where it is desired to rotate die 101, the die can be operatively connected to and rotated by a rotation driving mechanism (not shown). Frame 104 includes an inlet port 106 for supplying jacketing material to die 101.

In an exemplary operation of extrusion unit 100, rods 11,51 with tapes 47,54 therearound are fed into the inlet side of die 100 as a jacketing material is supplied under suitable temperature and pressure conditions to inlet port 106. The jacketing material is then extruded onto and around tapes 47,54, and, as the cable jacketing material is expressed through die 101, cable jackets 45,55 take the shape of profile 102. The channels 102a and ridges 102b of profile 102 create the crests and hollows 46a,46b;56a,56b of profiles 46,56. Profile 102 can be shaped to create a repeating cycle of crests and hollows in a cable jacket, at a given angular period relative to a center of the cable, for example, as shown by angle (FIG. 6). The magnitude of angle may range from, as a rough example, 5 to 50 degrees or more. The repeating cycle of crests and hollows may be symmetrical about the center of the cables.

Figures 9, 10:
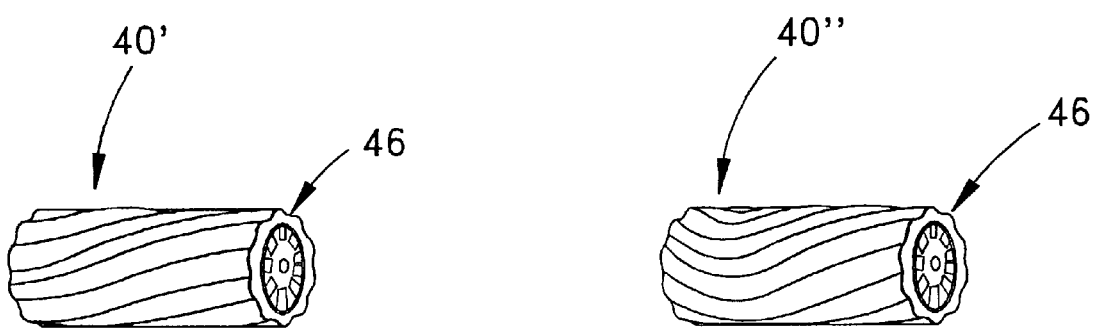
FIG. 9 is an isometric view of a fiber optic cable according to the present invention.
FIG. 10 is an isometric view of a fiber optic cable according to the present invention.

Die 101 may be stationary relative to frame 104 so that profiles 46,56 are parallel to the axis of the cable, or die 101 may be completely or alternately rotated to create continuous or intermittent helical or SZ shaped profiles 46,56. The rotation driving mechanism can be operatively connected to a controller which compels the desired motion output. The controller can be operatively associated with helix or switchback sensors, as disclosed in U.S. Pat. No. 5,729,966 and U.S. Ser. No. 08/873,511, U.S. Pat. No. 5,904,037 both of which are incorporated by reference herein, so that the die 100 can form helical or SZ shaped profiles 46,56. In this way, the shape of the profiles 46,56 can include a helical or SZ configuration that exactly or roughly traces the helical or SZ recesses 13 of components 10,10',10" (FIGS. 3, 9 and 10). In the case of SZ profiles 46,56, the locations of the switchbacks of the grooves 13 in components 10,10',10" can be inferred from observing the SZ configuration of profiles 46,56 formed in cable jacket 45,55. Alternatively, die 101 can remain stationary while rods 11,51 are completely or alternately rotated to create helical or SZ shaped profiles 46,56 in cable jackets 45,55. The disclosure of U.S. Pat. No. 4,548,567, which discloses a rotating die for use with slotted core members, is incorporated by reference herein.

Component 10,10',10" of the present invention have many advantages, for example, fiber optic cables made according to the present invention can be light in weight and/or have a low resistance to cable pulling forces. For example, since rod 11 can include one or more layers having a cellularized structure, fiber optic cable components 10,10',10" can be relatively lighter for a given diameter. Because of the relatively lower weight, greater lengths of cables made according to the present invention can be put on a reel. Additionally, cellularized rods made according to the present invention use less plastic material realizing a cost savings. Another advantage is that since cable components 10,10',10" can include gas filled cells, the amount of fuel that the cable provides in a fire can be lessened, so that the flame retardant cable jacket can be thinner, resulting in a still smaller, lighter, and less costly cable. Alternatively, a less costly flame retardant jacketing compound can be used. Moreover, profiles 46,56 present a minimized surface area contact to a cable passageway, i.e., two crests can rest on a cable passageway with at least one hollow therebetween. In other words, crests according to the present invention are shaped to define substantially narrowed contact interfaces with a cable passageway surface or other surfaces in a cable passageway, e.g., other cables, thereby minimizing surface area contact for providing low resistance to cable pulling forces and ease of installation.

Persons of ordinary skill in the art will appreciate that the foregoing embodiments of the present invention are intended to be illustrative of the inventive concepts rather than limiting. Moreover, persons of skill in the art will understand that variations can be made to the present invention without departing from the scope of the appended claims. For example, although recesses 13 comprise a generally rectangular cross sectional shape, they may comprise such other cross sectional shapes as are suitable for receiving optical ribbons or fibers. Moreover, as shown in FIG. 3, the lay of recesses 13 may be helical; other lay configurations may be used as well, for example, an S-Z stranded lay configuration. Although the surface irregularities of cable jacket 45 have been described with reference to an undulated profile, the skilled artisan will appreciate that other surface irregularities can be used that will exhibit a suitably low resistance to a cable pulling force, for example: an apex of any of the crests or hollows may be more sharply defined to roughly come to a rounded-off point, can be more rounded than shown in the drawing figures, or can be truncated with flat zones. In addition, the surface irregularities can include, e.g., dimple-like indentations, a saw-tooth configuration, ripples, teat-like extensions, lines, grooves, etc. In addition, profiles 46,56 may be modified to include step-like or additional sinusoidal shapes modifying the basic sinusoidal profile. The profiles of cable jackets made according to the present invention, although shown as having a center coincident with the center of the cable, can be eccentric with respect to the center of the cable. The profiles 46,56 of the present invention can roughly approximate a sinusoidal wave, or they can approximate a sinusoidal function with mathematical precision within a nominal range. In addition, rather than being symmetrical, profiles 46,56 can include an asymmetrical configuration. Although the embodiments presented hereinabove discuss components of the slotted core type, skilled artisans will appreciate that cable jackets 46,56 can be applied over other types of fiber optic cable components which require cable jackets, for example, components of the core tube, buffer tube, fiber bundle, or optical ribbon types having a parallel, helical, or SZ feature. Fiber optic cables made in accordance with the present invention can be used with a standard pulling attachment.

Accordingly, what is claimed is:

1. A fiber optic cable, comprising:
   a cellularized cable component, said cellularized cable component including at least one optical fiber; and
   a cable jacket, said cable jacket comprising surface irregularities for low resistance to a cable pulling force.

2. The fiber optic cable of claim 1, wherein said cable component is of the slotted core type.

3. The fiber optic cable of claim 1, said surface irregularities including crests and hollows having generally arcuate surfaces.

4. The fiber optic cable of claim 1, said surface irregularities including a sinusoidal-like shape.

5. The fiber optic cable of claim 1, said surface irregularities including a center aligned with a center of said fiber optic cable.

6. The fiber optic cable of claim 1, said surface irregularities including a repeating cycle.

7. The fiber optic cable of claim 6, said repeating cycle including crests and hollows formed at a given angular period.

8. The fiber optic cable of claim 7, said angular period including a range of about 5 to 50 degrees.

9. The fiber optic cable of claim 1, said cable jacket including at least two crests that can rest on a flat surface with at least one hollow therebetween.

10. The fiber optic cable of claim 1, said surface irregularities being generally longitudinally shaped along said fiber optic cable.

11. The fiber optic cable of claim 1, said surface irregularities being generally helically shaped along said fiber optic cable.

12. The fiber optic cable of claim 11, said helically shaped profile following a helical shape of said cable component.

13. The fiber optic cable of claim 1, said surface irregularities being generally SZ shaped along said fiber optic cable.

14. The fiber optic cable of claim 13, said SZ shaped surface irregularities following an SZ shape of said cable component.

15. The fiber optic cable of claim 1, said cellularized component comprising a rod.

16. The fiber optic cable of claim 1, said cellularized component comprising gas-filled cells.

17. The fiber optic cable of claim 1, said cellularized component comprising particles.

18. The fiber optic cable of claim 1, said cellularized component comprising micro-spheres.

19. The fiber optic cable of claim 1, said cellularized component comprising 50% gas-filled voids or more.

20. The fiber optic cable of claim 1, said cellularized component including multiple layers, at least one layer is cellularized.

21. The fiber optic cable of claim 1, said jacket including at least one friction reducing additive.

22. The fiber optic cable of claim 21, said friction reducing additive being a material selected from the group of consisting of a fatty acid, a silicone, a fluoro-compound, and a mineral oil.

23. The fiber optic cable of claim 1, said cellularized cable component including a skin layer.

24. A fiber optic cable, comprising: an fiber optic cable component including at least one optical fiber therein; and
   a cable jacket, said cable jacket comprising surface irregularities, said surface irregularities including a generally sinusoidal-like shape.

25. The fiber optic cable of claim 24, said surface irregularities including a continuous series of crests and hollows having generally arcuate surfaces.

26. The fiber optic cable of claim 24, said surface irregularities including a center aligned with a center of said fiber optic cable.

27. The fiber optic cable of claim 24, said surface irregularities including a repeating cycle.

28. The fiber optic cable of claim 27, said repeating cycle including crests and hollows formed at a given angular period.

29. In a method of making a fiber optic cable, comprising:
   extruding a cable jacket on a fiber optic cable component having at least one optical fiber therein; and
   shaping surface irregularities in said cable jacket in the form of undulations, said step of forming said undulations including forming said undulations into a helical formation, said helical formation roughly tracing at least one helical feature of said fiber optic cable component.

30. The method of claim 29, said step of shaping said profile including forming said undulations into an SZ formation.

31. The method of claim 30, said SZ formation roughly tracing at least one SZ feature of said fiber optic cable component.

32. A die for extruding a cable jacket material onto a fiber optic cable component, said die comprising:
   a profile having crests and hollows formed therein for shaping said cable jacket material whereby said cable jacket material is extruded onto a cable component containing at least one optical fiber therein; said die forming surface irregularities in said cable jacket as said cable jacket material is extruded onto said fiber optic cable component.

33. The die of claim 32, wherein said die is stationary.

34. The die of claim 32, wherein said die is rotatable.

* * * * *